(12) United States Patent
Rydberg

(10) Patent No.: US 8,201,871 B1
(45) Date of Patent: Jun. 19, 2012

(54) ROLL-DOWN CARGO DOOR ARRANGEMENTS FOR VEHICLES

(76) Inventor: James D. Rydberg, Huntington, NY (US)

( * ) Notice: Subject to any disclaimer, the term of this patent is extended or adjusted under 35 U.S.C. 154(b) by 0 days.

(21) Appl. No.: 13/091,127

(22) Filed: Apr. 21, 2011

(51) Int. Cl.
*B60J 5/06* (2006.01)
*B60J 5/08* (2006.01)
*B60J 5/12* (2006.01)
*B60J 5/14* (2006.01)

(52) U.S. Cl. ............... 296/186.2; 296/24.45; 296/186.4; 296/155

(58) Field of Classification Search .............. 296/24.35, 296/24.44, 24.45, 181.1, 182.1, 186.1, 186.2, 296/186.4, 146.1, 147, 155, 146.8, 146.11, 296/146.12, 146.13, 50
See application file for complete search history.

(56) References Cited

U.S. PATENT DOCUMENTS

| | | | |
|---|---|---|---|
| 127,006 A | 5/1872 | Wright et al. | |
| 169,449 A | 11/1875 | Knepper | |
| 958,861 A | 5/1910 | Hedwall | |
| 1,159,859 A | 11/1915 | Murphy | |
| 1,209,129 A | 12/1916 | Cross | |
| 1,407,856 A | 2/1922 | Gugino | |
| 1,798,011 A * | 3/1931 | Cernuda | 296/178 |
| 1,994,201 A | 3/1935 | Repetto | |
| 2,206,599 A | 7/1940 | Denison | |
| 2,766,822 A | 10/1956 | Potter | |
| 3,352,594 A * | 11/1967 | Miller | 296/3 |
| 3,411,560 A | 11/1968 | Haury | |
| 3,699,716 A * | 10/1972 | Wanlass | 49/40 |
| D268,997 S * | 5/1983 | Dubernard | D12/84 |
| 4,621,862 A * | 11/1986 | Kramer | 296/186.2 |
| 4,659,132 A * | 4/1987 | Day | 296/186.4 |
| 4,801,172 A * | 1/1989 | Townsend | 296/155 |
| 5,104,172 A * | 4/1992 | Schildt | 296/50 |
| 5,110,172 A * | 5/1992 | Ney et al. | 296/50 |
| 5,184,864 A * | 2/1993 | Teigen et al. | 296/186.4 |
| 5,524,960 A * | 6/1996 | Townsend | 296/155 |
| 5,547,241 A * | 8/1996 | Villella et al. | 296/24.45 |
| 5,669,307 A * | 9/1997 | Cichy | 104/28 |
| 5,829,823 A * | 11/1998 | Swenson | 296/186.1 |
| 6,022,067 A * | 2/2000 | Hargett et al. | 296/186.2 |
| 6,053,554 A * | 4/2000 | Doniaz | 296/50 |
| 6,257,651 B1 * | 7/2001 | Morbach et al. | 296/146.13 |
| 6,494,519 B2 * | 12/2002 | Sturgin et al. | 296/50 |
| 6,533,334 B1 * | 3/2003 | Bonn | 285/145.5 |

(Continued)

FOREIGN PATENT DOCUMENTS

FR 2553347 * 4/1985

*Primary Examiner* — Glenn Dayoan
*Assistant Examiner* — Gregory Blankenship
(74) *Attorney, Agent, or Firm* — Chadbourne & Parke LLP; Brian R. Pollack, Esq.

(57) ABSTRACT

The disclosure includes a cargo vehicle. The cargo vehicle includes a cargo compartment, which in turn is defined by a floor, a plurality of adjoining walls extending upwardly from the floor, and a ceiling attached to an upper end of the plurality of adjoining walls, wherein the walls, floor and ceiling cooperate to form the cargo compartment and a first vertical opening having a width defined by first and second sides for accessing the interior of the cargo compartment. The vehicle further includes a first segmented retractable door proximate the first vertical opening of the cargo compartment. The first door is displaceable from a first vertically-oriented closed position in which the door covers the first vertical opening to a second open position in which the door is substantially disposed below the first vertical opening.

19 Claims, 6 Drawing Sheets

U.S. PATENT DOCUMENTS

| | | | |
|---|---|---|---|
| 6,685,254 B2 * | 2/2004 | Emmons et al. | 296/178 |
| 7,077,459 B2 * | 7/2006 | Toth et al. | 296/178 |
| 7,354,089 B2 * | 4/2008 | Hobrecht | 296/26.07 |
| 2002/0060472 A1 * | 5/2002 | Dodson et al. | 296/155 |
| 2005/0275245 A1 * | 12/2005 | Harrison | 296/186.4 |
| 2010/0127523 A1 * | 5/2010 | Boutin et al. | 296/10 |

* cited by examiner

ROLL-DOWN CARGO DOOR ARRANGEMENTS FOR VEHICLES

BACKGROUND

1. Field of the Disclosure

The present disclosure relates to improved systems and methods for operating doors. Particularly, the present disclosure is directed to roll-down doors for vehicles, such as trucks and vans.

2. Description of Related Art

Cargo trucks and vans can be provided with a variety of cargo doors. While some have hinged swing doors or bifold doors that open along vertically-oriented hinges, other cargo doors include roll-up doors that open by being lifted along a vertical direction. Roll-up doors generally have horizontally-oriented panels that are hinged together to permit the door to articulate as it is rolled up along side rails until it is parallel to the roof of the vehicle. Other doors such as ramp doors, which are hinged at the bottom and are used as a ramp, have been used widely in trailers, such as those used to transport horses and those used by contractors to transport tools or mobile workshops. The disclosed embodiments provide a number of improvements and refinements that address deficiencies in previous approaches.

SUMMARY OF THE DISCLOSURE

The purpose and advantages of the present disclosure will be set forth in and become apparent from the description that follows. Additional advantages of the disclosed embodiments will be realized and attained by the methods and systems particularly pointed out in the written description hereof, as well as from the appended drawings.

To achieve these and other advantages and in accordance with the purpose of the disclosure, as embodied herein, the disclosure includes a cargo vehicle. The cargo vehicle includes a cargo compartment, which in turn is defined by a floor, a plurality of adjoining walls extending upwardly from the floor, and a ceiling attached to an upper end of the plurality of adjoining walls, wherein the walls, floor and ceiling cooperate to form the cargo compartment and a first vertical opening having a width defined by first and second sides for accessing the interior of the cargo compartment. The vehicle further includes a first segmented retractable door proximate the first vertical opening of the cargo compartment. The first door is displaceable from a first vertically-oriented closed position in which the door covers the first vertical opening to a second open position in which the door is substantially disposed below the first vertical opening. The vehicle further includes a first track adapted and configured to receive a first side of the first segmented door, the first track having a first vertically oriented segment disposed along the first side of the first vertical opening, and a second track adapted and configured to receive a second side of the first segmented door, the second track having a first vertically oriented segment disposed along the second side of the first vertical opening, wherein the first segmented door is downwardly displaceable along the first and second tracks from the first position to the second position.

If desired, the first segmented retractable door can be adapted and configured to fold in an accordion-like fashion through an opening defined by the floor of the cargo compartment. Accordingly, an uppermost segment of the first segmented retractable door can be adapted and configured to form a cover that covers the opening defined by the floor of the cargo compartment. If desired, the lower end of the first segmented retractable door can be fixedly attached to the cargo vehicle.

In accordance with a further aspect, the first segmented retractable door can be attached to a spring mechanism, wherein at least one spring in the spring mechanism is loaded when the first segmented retractable door is opened, and further wherein energy from loading the at least one spring can be released by closing the first segmented retractable door. The vehicle can further include a latch for holding the first segmented retractable door in an open position, wherein the latch can be released to permit the first segmented retractable door to close with the assistance of energy loaded into the at least one spring. In one embodiment, the latch automatically actuates when the first segmented retractable door is opened to maintain the first segmented retractable door in an open condition. If desired, the latch can be released by pressing downwardly on the first segmented retractable door.

In one embodiment, the at least one spring can be a compressive spring that is compressed when it is loaded. A first end of the compressive spring can be in operable contact with a portion of the first segmented retractable door, and a second end of the compressive spring can be in contact with a support attached to the cargo vehicle, such that the compressive spring is compressed between the portion of the first segmented retractable door and the support when the first segmented retractable door is opened, and wherein the compressive spring provides a spring force to assist in closing the first segmented retractable door.

In accordance with another embodiment, the at least one spring can be a tension spring that is elongated when it is loaded. A first end of the tension spring can be in operable contact with a portion of the first segmented retractable door, and a second end of the tension spring can be in contact with a support attached to the cargo vehicle, such that the tension spring is elongated and tensioned when the first segmented retractable door is opened, and wherein the tension spring provides a spring force to assist in closing the first segmented retractable door.

In accordance with yet another embodiment the at least one spring can be a torsion spring defining a spring axis through its center, the torsion spring being reduced from a first diameter to second diameter with respect to the spring axis when it is loaded. Accordingly, the first track can further include a second substantially horizontally oriented segment connected to the first vertically oriented segment disposed along and below the floor of the cargo compartment and a third curved segment connected to the second segment, wherein the third segment is also disposed below the floor of the cargo compartment. The second track can further include a second substantially horizontally oriented segment connected to the first vertically oriented segment disposed along and below the floor of the cargo compartment and a third curved segment connected to the second segment, wherein the third segment is also disposed below the floor of the cargo compartment. The cargo vehicle can further include a rotating drum disposed below the floor of the cargo compartment adapted to rotate about a horizontal drum axis substantially defined by a center of radius of curvature of the third curved segment of the first track and the third curved segment of the second track, wherein the first segmented retractable door is adapted and configured to roll into a cylindrical shape around the rotating drum, and further wherein the axis of the torsion spring is substantially coincident with the drum axis, and further wherein the torsion spring is loaded when the first segmented retractable door is wound about the drum, and the torsion spring is unloaded when the first segmented retractable door is unwound from the drum, such that the torsion spring facilitates closure of the first segmented retractable door.

In accordance with still another embodiment, the first track can further include a second substantially horizontally oriented segment connected to the first vertical segment disposed along and below the floor of the cargo compartment, and the second track can further include a second substantially horizontally oriented segment connected to the first vertical segment disposed along and below the floor of the cargo compartment, wherein the first segmented retractable door is downwardly displaceable along the first and second tracks from the first position to the second position.

In accordance with a further embodiment, the cargo compartment can define a second vertical opening having a width defined by first and second sides for accessing the interior of the cargo compartment. The cargo vehicle can further include a second segmented retractable door movably disposed in a track proximate the second vertical opening of the cargo compartment. The second segmented retractable door is displaceable from a first vertically-oriented closed position in which the second segmented retractable door covers the second vertical opening, to a second open position in which the second segmented retractable door is substantially disposed below the second vertical opening. The cargo compartment can further includes a third track adapted and configured to receive a first side of the second segmented retractable door, the third track having a first vertically oriented segment disposed along the first side of the second vertical opening, and a fourth track adapted and configured to receive a second side of the second segmented retractable door, the fourth track having a first vertically oriented segment disposed along the second side of the second vertical opening, wherein the second segmented retractable door is downwardly displaceable along the third and fourth tracks from the first position to the second position.

In accordance with a further aspect, the first track, second track, third track and fourth track can each further include horizontal portions extending under the cargo vehicle at different depths below the floor of the cargo compartment such that the first segmented retractable door and second segmented retractable door can slide past each other along the bottom of the cargo compartment. If desired, the first vertical opening and the second vertical opening can be located on opposite sides of the cargo compartment.

In accordance with still a further embodiment, the cargo vehicle can include a plurality of pairs of opposing downwardly retractable doors, wherein each door retracts downwardly below the floor of the cargo compartment. Doors in each pair of opposing downwardly retractable doors can be adapted and configured to slide past each other below the cargo vehicle.

In accordance with another embodiment, the cargo compartment can define a third vertical opening at the back of the cargo compartment having a width defined by first and second sides for accessing the interior of the cargo compartment, and wherein the cargo vehicle further includes a third segmented retractable door movably disposed in a track proximate the third vertical opening of the cargo compartment. The third segmented retractable door is displaceable from a first vertically-oriented closed position in which the second segmented retractable door covers the third vertical opening, to a second open position in which the third segmented retractable door is substantially disposed below the third vertical opening. The cargo compartment can further include a fifth track adapted and configured to receive a first side of the third segmented retractable door, the fifth track having a first vertically oriented segment disposed along the first side of the third vertical opening, and a sixth track adapted and configured to receive a second side of the third segmented retractable door, the sixth track having a first vertically oriented segment disposed along the second side of the third vertical opening, wherein the second segmented retractable door is downwardly displaceable along the fifth and sixth tracks from the first position to the second position. If desired, the first track, second track, third track, fourth track, fifth track and sixth track can each further include horizontal portions extending under the cargo vehicle at different depths below the floor of the cargo compartment such that the first segmented retractable door, second segmented retractable door and third segmented retractable door can slide past each other along the bottom of the cargo compartment. In accordance with a different embodiment, the first segmented retractable door, second segmented retractable door and third segmented retractable door can be adapted and configured to fold in an accordion-like fashion through first, second and third openings defined by the floor of the cargo compartment.

It is to be understood that both the foregoing general description and the following detailed description are exemplary and are intended to provide further explanation of the embodiments disclosed herein.

The accompanying drawings, which are incorporated in and constitute part of this specification, are included to illustrate and provide a further understanding of the method and system of the disclosure. Together with the description, the drawings serve to explain the principles of the disclosed embodiments.

DETAILED DESCRIPTION

Reference will now be made in detail to the present preferred embodiments of the disclosure, examples of which are illustrated in the accompanying drawings. The methods and corresponding steps of the disclosed embodiments will be described in conjunction with the detailed description of the system.

The devices and methods presented herein relate to improved systems and methods for operating doors. The present disclosed embodiments are particularly directed to roll-down doors for vehicles, such as trucks and vans. Such embodiments are very useful when contrasted with "roll-up" doors because such roll-up doors have the inherent disadvantage of occupying critical ceiling space in a cargo compartment, since the door needs to occupy some space. While this particular problem can be avoided by use of hinged doors that swing outwardly, it is possible that such doors may need to be opened prior to backing a vehicle up to a loading dock, which can be dangerous in the area of a loading dock. The subject embodiments are adapted and configured to provide roll-down doors with minimal profile underneath the rear end of a cargo vehicle providing the advantages of a roll up door, without the attendant disadvantages. More particularly, the path followed by roll down doors herein preferably includes passing the doors near the underside of the cargo compartment to avoid interference with mechanical components as well as not impeding vehicular ground clearance when the cargo door(s) is (are) open.

In accordance with the disclosure, a cargo vehicle is provided. Such a device can be, for example, a truck, a van, a cargo trailer, or the like.

Figure 1A:
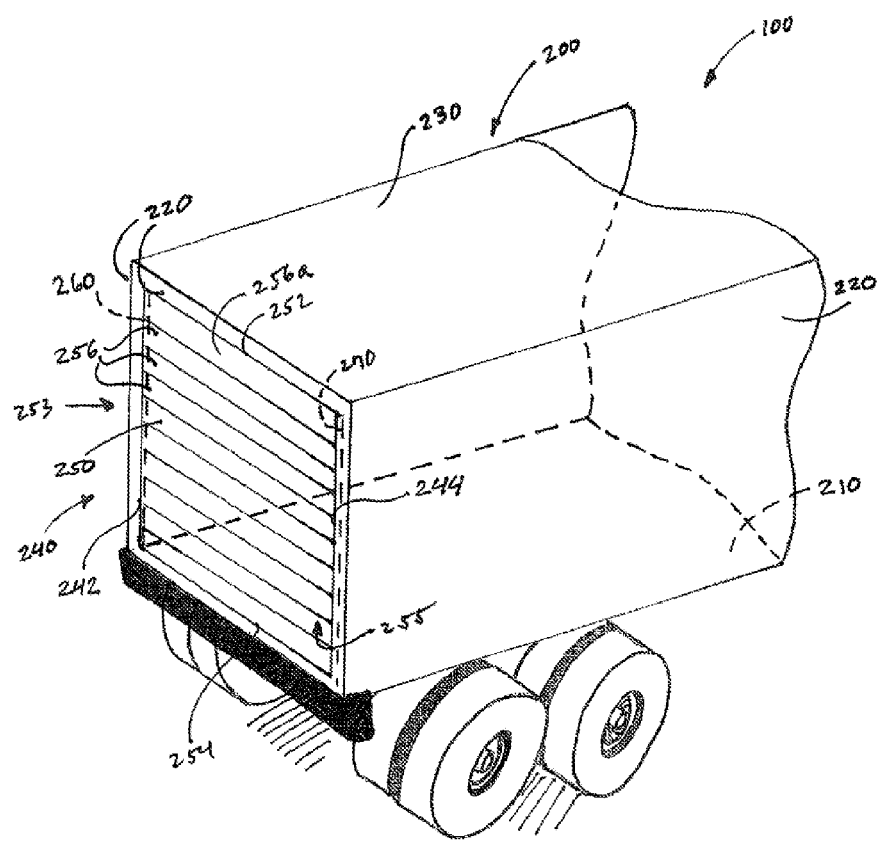
FIG. 1A is an isometric view of a portion of a first representative embodiment of a cargo vehicle in accordance with the present disclosure illustrating a roll-down cargo door in a closed position.
Figure 1B:
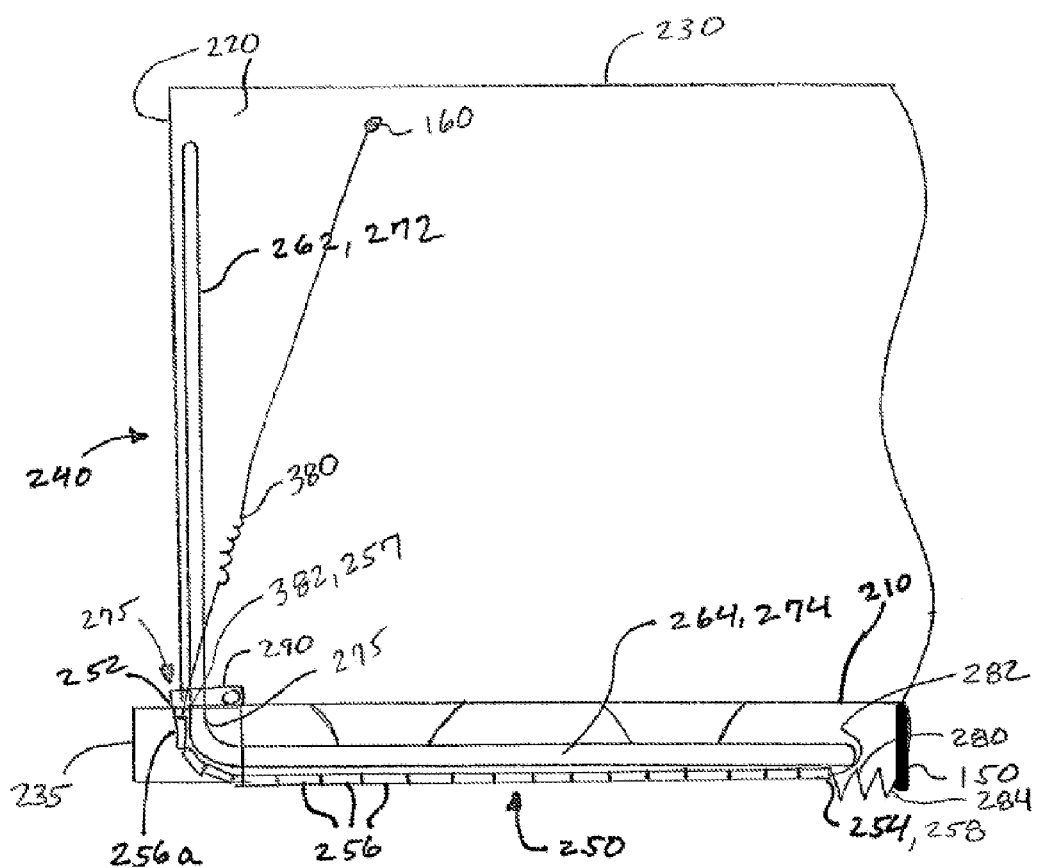
FIG. 1B is a schematic side view of the embodiment of FIG. 1A illustrating tension and compression spring mechanisms for assisting in lifting the door to a closed position, which further illustrates a rail system for conveying the roll-down door.

For purposes of illustration, and not limitation, a partial view of an exemplary embodiment of a cargo vehicle 100 is provided in FIGS. 1A-1B. The cargo vehicle 100 includes a cargo compartment 200, which in turn is defined by a floor 210, a plurality of adjoining walls 220 extending upwardly from the floor, and a ceiling 230 attached to an upper end of the plurality of adjoining walls. The walls 220, floor 210 and ceiling 230 cooperate to form the cargo compartment 200 and a first vertical opening 240 having a width defined by first and second sides 242, 244 for accessing the interior of the cargo compartment 200. The vehicle further includes a first segmented retractable door 250 proximate the first vertical opening of the cargo compartment. As depicted, the door includes an upper end 252, a lower end 254 and a plurality of segments 256. The first door 250 is displaceable from a first vertically-oriented closed position in which the door covers the first vertical opening (FIG. 1A) to a second open position in which the door is substantially disposed below the first vertical opening (FIG. 1B). The vehicle 100 further includes a first track 260 adapted and configured to receive a first side 253 of the first segmented door 250, the first track having a first vertically oriented segment 262 disposed along the first side 242 of the first vertical opening 240, and a second track 270 adapted and configured to receive a second side 255 of the first segmented door 250, the second track 270 having a first vertically oriented segment 272 disposed along the second side 244 of the first vertical opening 240, wherein the first segmented door 250 is downwardly displaceable along the first and second tracks 260, 270 from the first position to the second position.

Figure 2:
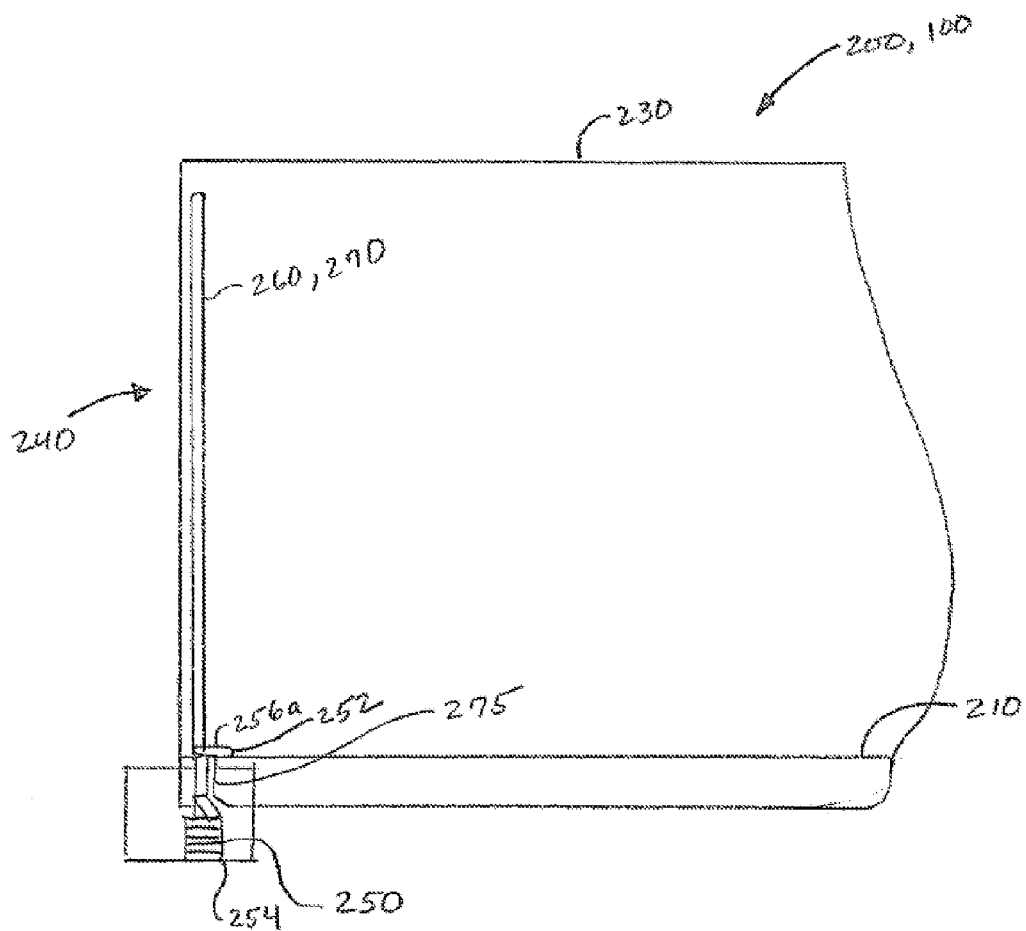
FIG. 2 is a schematic view of a roll down door that collapses into a lower compartment (e.g., bumper) of a cargo vehicle in accordance with the present disclosure.

If desired, the first segmented retractable door 250 can be adapted and configured to fold in an accordion-like fashion through an opening 275 defined by the floor 210 of the cargo compartment 200 (FIG. 2). Accordingly, an uppermost segment 256a of the first segmented retractable door 250 can be adapted and configured to form a cover that covers the opening defined by the floor of the cargo compartment. If desired, the lower end 254 of the first segmented retractable door can be fixedly attached to the cargo vehicle 100.

In accordance with a further aspect, with further reference to FIGS. 1A-1B, the first segmented retractable door 250 can be attached to a spring mechanism 280, wherein at least one spring in the spring mechanism is loaded when the first segmented retractable door 250 is opened, and further wherein energy from loading the at least one spring 280 can be released by closing the first segmented retractable door 250. The vehicle 200 can further include a latch 290 for holding the first segmented retractable door 250 in an open position, wherein the latch 290 can be released to permit the first segmented retractable door 250 to close with the assistance of energy loaded into the at least one spring 280. In one embodiment, if desired, the latch 290 automatically actuates (and locks the door in an open position) when the first segmented retractable door 250 is opened to maintain the first segmented retractable door in an open condition. If desired, the latch 290 can be released by pressing downwardly on the first segmented retractable door, permitting the door to be pushed upwards by the spring 280, preferably under assistance of a user.

In one embodiment, as illustrated in FIGS. 1A-1B, the at least one spring 280 can be a compressive spring 280 that is compressed when it is loaded. A first end 282 of the compressive spring can be in operable contact with a portion 258 of the first segmented retractable door 250, and a second end 284 of the compressive spring 280 can be in contact with a support 150 attached to the cargo vehicle 100, such that the compressive spring 280 is compressed between the portion 258 of the first segmented retractable door 250 and the support 150 when the first segmented retractable door 250 is opened, and wherein the compressive spring 280 provides a spring force to assist in closing the first segmented retractable door 250.

In accordance with another embodiment, as set forth in FIGS. 1A-1B, the at least one spring can be a tension spring 380 that is elongated when it is loaded. A first end 382 of the tension spring 380 can be in operable contact with a portion 257 of the first segmented retractable door 250, and a second end 384 of the tension spring 380 can be in contact with a support 160 attached to the cargo vehicle, such that the tension spring 380 is elongated and tensioned when the first segmented retractable door 250 is opened, and wherein the tension spring 380 provides a spring force to assist in closing the first segmented retractable door.

As depicted in FIGS. 1A-1B, the first track 260 can further include a second substantially horizontally oriented segment 264 connected to the first vertical segment 262 disposed along and below the floor 210 of the cargo compartment 200, and the second track 270 can further include a second substantially horizontally oriented segment 274 connected to the first vertical segment 272 disposed along and below the floor of the cargo compartment, wherein the first segmented retractable door 250 is downwardly displaceable along the first and second tracks 250, 260 from the first position to the second position.

Figure 3:
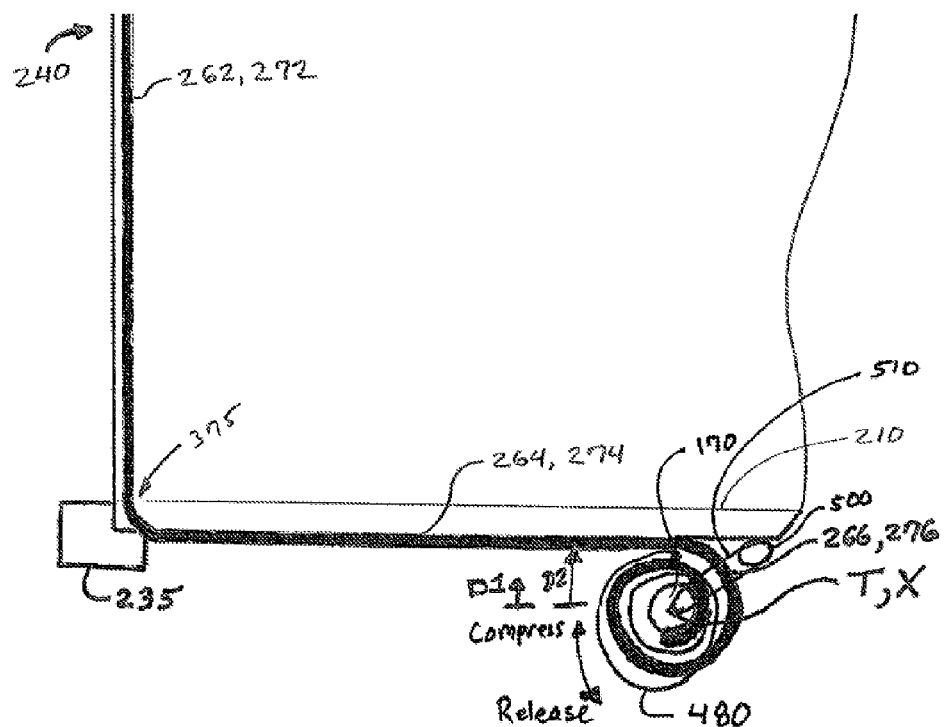
FIG. 3 is a schematic view of an embodiment of a roll down cargo door driven by a torsion spring and/or motor and drive system wherein the door wraps around a rotating drum when retracted while a torsion spring is loaded by virtue of movement of the door.

In accordance with yet another embodiment (FIG. 3) the at least one spring can be a torsion spring 480 defining a spring axis "T" through its center, the torsion spring 480 being reduced from a first diameter D1 to second diameter D2 with respect to the spring axis T when it is loaded. Accordingly, the first track 260 can further include a second substantially horizontally oriented segment 264 connected to the first vertically oriented segment 262 disposed along and below the floor 210 of the cargo compartment 200 and a third curved segment 266 connected to the second segment 264, wherein the third segment 266 is also disposed below the floor 210 of the cargo compartment 200. The second track 270 can further include a second, substantially horizontally oriented segment 274 connected to the first vertically oriented segment 272 disposed along and below the floor 210 of the cargo compartment 200 and a third curved segment 276 connected to the second segment 274, wherein the third segment 276 is also disposed below the floor 210 of the cargo compartment 210.

The cargo vehicle can further include a rotating drum 170 disposed below the floor 210 of the cargo compartment 210 adapted to rotate about a horizontal drum axis X substantially defined by a center of radius of curvature of the third curved segment 266 of the first track 260 and the third curved segment 276 of the second track 270, wherein the first segmented retractable door 250 is adapted and configured to roll into a cylindrical shape around the rotating drum 170, and further wherein the axis T of the torsion spring is substantially coincident with the drum axis X, and further wherein the torsion spring 480 is loaded when the first segmented retractable door 250 is wound about the drum 170, and the torsion spring 480 is unloaded when the first segmented retractable door 250 is unwound from the drum 170, such that the torsion spring 480 facilitates closure of the first segmented retractable door 250.

While springs are depicted herein for facilitating closure of door 250, it will be appreciated that all three types of springs may be used at once if desired, or any two of the three arrangements may be used, as well as each methodology individually. Moreover, it will be appreciated that motor 500 can also be used, for example, with a gear and/or chain drive 510 for facilitating closure of door 250.

Figure 4:
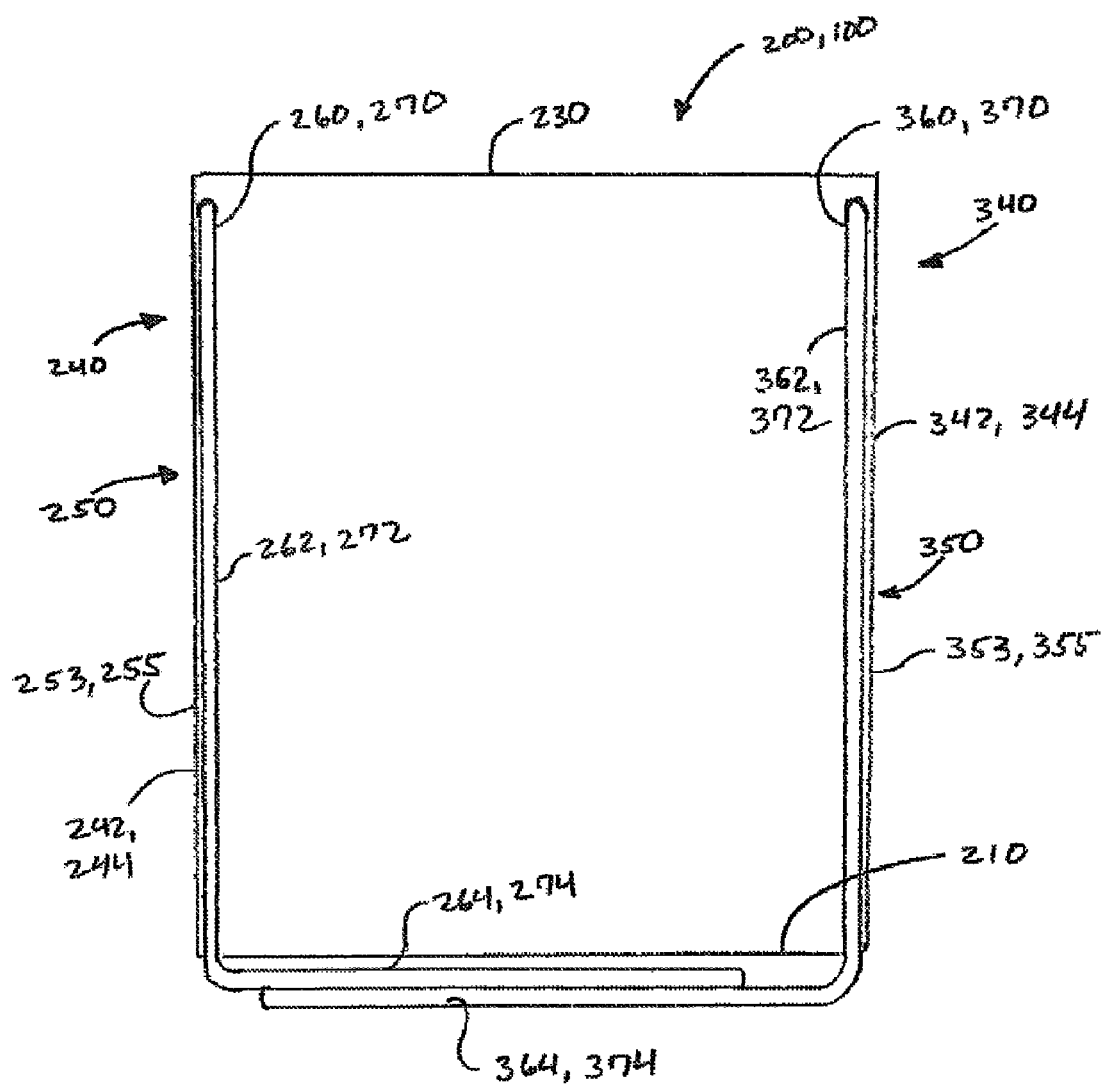
FIG. 4 is a schematic view of a portion of a further representative embodiment of a cargo vehicle in accordance with the present disclosure that provides opposing roll down cargo doors that are able to slide past each other beneath the floor of a cargo compartment.

In accordance with a further embodiment as depicted in FIG. 4, the cargo compartment 200 can define a second vertical opening 340 having a width defined by first and second sides 342, 344 for accessing the interior of the cargo compartment 200. The cargo vehicle can further include a second segmented retractable door 350 proximate the second vertical opening 340 of the cargo compartment 200. The second segmented retractable door 350 is displaceable from a first vertically-oriented closed position in which the second segmented retractable door 350 covers the second vertical opening, to a second open position in which the second segmented retractable door 350 is substantially disposed below the second vertical opening 340. The cargo compartment 200 can further includes a third track 360 adapted and configured to receive a first side 353 of the second segmented retractable door 350, the third track 360 having a first vertically oriented segment 362 disposed along the first side 342 of the second vertical opening 340, and a fourth track 370 adapted and configured to receive a second side 355 of the second segmented retractable door 350, the fourth track 370 having a first vertically oriented segment 372 disposed along the second side 344 of the second vertical opening 340, wherein the second segmented retractable door 350 is downwardly displaceable along the third and fourth tracks 360, 370 from a first closed position to the second open position.

In accordance with a further aspect, as illustrated, the first track 260, second track 270, third track 360 and fourth track 370 can each further include horizontal portions 264, 274, 364, 374 extending under the cargo vehicle 100 at different depths below the floor 210 of the cargo compartment 210 such that the first segmented retractable door 250 and second segmented retractable door 350 can slide past each other along the bottom 210 of the cargo compartment 200. If desired, the first vertical opening 240 and the second vertical opening 340 can be located on opposite sides of the cargo compartment as depicted in FIG. 4. In accordance with still a further embodiment, the cargo vehicle 100 can include a plurality of pairs of opposing downwardly retractable doors 250, 350, wherein each door retracts downwardly below the floor of the cargo compartment. Doors in each pair of opposing downwardly retractable doors can be adapted and configured to slide past each other below the cargo vehicle. Such an arrangement can be particularly useful for vehicles that deliver many of the same type of article (e.g., beverage trucks).

Figure 5:
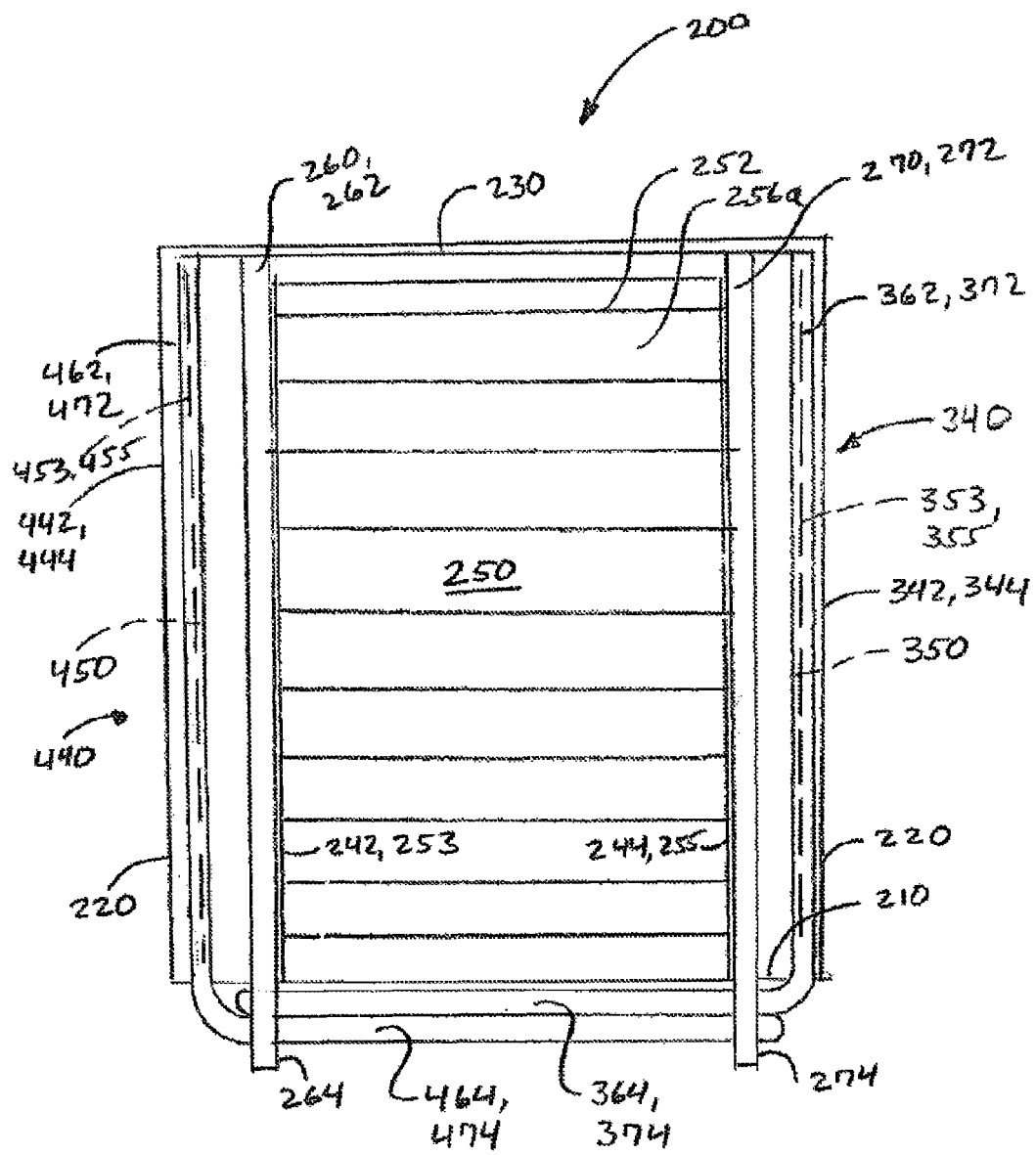
FIG. 5 is a schematic view of a portion of still a further representative embodiment of a cargo vehicle in accordance with the present disclosure that provides opposing roll down cargo doors and a third door located at the trailing end of a vehicle that are able to slide past each other beneath the floor of a cargo compartment.

In accordance with still another embodiment and as illustrated in FIG. 5, the cargo compartment 200 can further define a third vertical opening 440 at the back of the cargo compartment having a width defined by first and second sides 442, 444 for accessing the interior of the cargo compartment 200, and wherein the cargo vehicle further includes a third segmented retractable door 450 movably disposed in a track proximate the third vertical opening 440 of the cargo compartment 200. The third segmented retractable door 450 is displaceable from a first vertically-oriented closed position in which the second segmented retractable door covers the third vertical opening 440, to a second open position in which the third segmented retractable door 450 is substantially disposed below the third vertical opening 440. The cargo compartment 200 can further include a fifth track 460 adapted and configured to receive a first side 553 of the third segmented retractable door 450, the fifth track 460 having a first vertically oriented segment 462 disposed along the first side 442 of the third vertical opening 440, and a sixth track 470 adapted and configured to receive a second side 455 of the third segmented retractable door 450, the sixth track having a first vertically oriented segment 462 disposed along the second side 444 of the third vertical opening 440, wherein the second segmented retractable door 450 is downwardly displaceable along the fifth and sixth tracks 460, 470 from the first position to the second position. If desired, the first track 260, second track 270, third track 360, fourth track 370, fifth track 460 and sixth track 470 can each further include horizontal portions 264, 274, 364, 374, 464, 474 extending under the cargo vehicle 100 at different depths below the floor 210 of the cargo compartment 200 such that the first segmented retractable door 250, second segmented retractable door 350 and third segmented retractable door 450 can slide past each other along the bottom 210 of the cargo compartment 200. In accordance with a different embodiment, the first segmented retractable door 250, second segmented retractable door 350 and third segmented retractable door 450 can be adapted and configured to fold in an accordion-like fashion through first, second and third openings defined by the floor of the cargo compartment in a manner consistent with the embodiment of FIG. 2.

The methods and systems of the present disclosure, as described above and shown in the drawings, provide for door systems with superior attributes as described herein. It will be apparent to those skilled in the art that various modifications and variations can be made in the device and method of the present disclosure without departing from the spirit or scope of the disclosure. Thus, it is intended that the present disclosure include modifications and variations that are within the scope of the subject disclosure and equivalents.

What is claimed is:

1. A cargo vehicle, comprising:
   a) a cargo compartment, the cargo compartment including:
      i) a floor;
      ii) a plurality of adjoining walls extending upwardly from the floor; and
      iii) a ceiling attached to an upper end of the plurality of adjoining walls, wherein the walls, floor and ceiling cooperate to form the cargo compartment and a first vertical opening having a width defined by first and second sides for accessing the interior of the cargo compartment;

b) a first segmented retractable door proximate the first vertical opening of the cargo compartment; the first door being displaceable from a first vertically-oriented closed position in which the door covers the first vertical opening, to a second open position in which the door is substantially disposed below the first vertical opening;

c) a first track adapted and configured to receive a first side of the first segmented door, the first track having a first vertically oriented segment disposed along the first side of the first vertical opening;

d) a second track adapted and configured to receive a second side of the first segmented door, the second track having a first vertically oriented segment disposed along the second side of the first vertical opening, wherein the first segmented door is downwardly displaceable along the first and second tracks from the first position to the second position; and e) a spring mechanism in operable communication with the first segmented retractable door, wherein at least one spring in the spring mechanism is loaded when the first segmented retractable door is opened, and further wherein energy from loading the at least one spring can be released by closing the first segmented retractable door.

2. The cargo vehicle of claim 1, wherein the first segmented retractable door is adapted and configured to fold in an accordion-like fashion through an opening defined by the floor of the cargo compartment.

3. The cargo vehicle of claim 2, wherein an uppermost segment of the first segmented retractable door is adapted and configured to form a cover that covers the opening defined by the floor of the cargo compartment.

4. The cargo vehicle of claim 2, wherein the lower end of the first segmented retractable door is fixedly attached to the cargo vehicle.

5. The cargo vehicle of claim 1, further comprising a latch for holding the first segmented retractable door in an open position, wherein the latch can be released to permit the first segmented retractable door to close with the assistance of energy loaded into the at least one spring.

6. The cargo vehicle of claim 5, wherein the latch automatically actuates when the first segmented retractable door is opened to maintain the first segmented retractable door in an open condition.

7. The cargo vehicle of claim 6, wherein the latch is released by pressing downwardly on the first segmented retractable door.

8. The cargo vehicle of claim 6, wherein:
a) the at least one spring is a compressive spring that is compressed when it is loaded;
b) a first end of the compressive spring is in operable contact with a portion of the first segmented retractable door; and
c) a second end of the compressive spring is in contact with a support attached to the cargo vehicle, such that the compressive spring is compressed between the portion of the first segmented retractable door and the support when the first segmented retractable door is opened, and wherein the compressive spring provides a spring force to assist in closing the first segmented retractable door.

9. The cargo vehicle of claim 6, wherein:
a) the at least one spring is a tension spring that is elongated when it is loaded;
b) a first end of the tension spring is in operable contact with a portion of the first segmented retractable door; and
c) a second end of the tension spring is in contact with a support attached to the cargo vehicle, such that the tension spring is elongated and tensioned when the first segmented retractable door is opened, and wherein the tension spring provides a spring force to assist in closing the first segmented retractable door.

10. The cargo vehicle of claim 6, wherein:
a) the at least one spring is a torsion spring defining a spring axis through its center, the torsion spring being reduced from a first diameter to second diameter with respect to the spring axis when it is loaded;
b) the first track further includes a second substantially horizontally oriented segment connected to the first vertically oriented segment disposed along and below the floor of the cargo compartment and a third curved segment connected to the second segment, wherein the third segment is also disposed below the floor of the cargo compartment;
c) the second track further includes a second substantially horizontally oriented segment connected to the first vertically oriented segment disposed along and below the floor of the cargo compartment and a third curved segment connected to the second segment, wherein the third segment is also disposed below the floor of the cargo compartment; and
d) the cargo vehicle further includes a rotating drum disposed below the floor of the cargo compartment adapted to rotate about a horizontal drum axis substantially defined by a center of radius of curvature of the third curved segment of the first track and the third curved segment of the second track, wherein the first segmented retractable door is adapted and configured to roll into a cylindrical shape around the rotating drum, and further wherein the axis of the torsion spring is substantially coincident with the drum axis, and further wherein the torsion spring is loaded when the first segmented retractable door is wound about the drum, and the torsion spring is unloaded when the first segmented retractable door is unwound from the drum, such that the torsion spring facilitates closure of the first segmented retractable door.

11. The cargo vehicle of claim 1, wherein:
a) the first track further includes a second substantially horizontally oriented segment connected to the first vertical segment disposed along and below the floor of the cargo compartment; and
b) the second track further includes a second substantially horizontally oriented segment connected to the first vertical segment disposed along and below the floor of the cargo compartment, wherein the first segmented retractable door is downwardly displaceable along the first and second tracks from the first position to the second position.

12. The cargo vehicle of claim 1, wherein the cargo compartment defines a second vertical opening having a width defined by first and second sides for accessing the interior of the cargo compartment, and wherein the cargo vehicle further includes:
a) a second segmented retractable door proximate the second vertical opening of the cargo compartment; the second segmented retractable door being displaceable from a first vertically-oriented closed position in which the second segmented retractable door covers the second vertical opening to a second open position in which the second segmented retractable door is substantially disposed below the second vertical opening;

c) a third track adapted and configured to receive a first side of the second segmented retractable door, the third track having a first vertically oriented segment disposed along the first side of the second vertical opening; and d) a fourth track adapted and configured to receive a second side of the second segmented retractable door, the fourth track having a first vertically oriented segment disposed along the second side of the second vertical opening, wherein the second segmented retractable door is downwardly displaceable along the third and fourth tracks from the first position to the second position.

13. A cargo vehicle, comprising:
  a) a cargo compartment, the cargo compartment including:
    i) a floor;
    ii) a plurality of adjoining walls extending upwardly from the floor; and
    iii) a ceiling attached to an upper end of the plurality of adjoining walls, wherein the walls, floor and ceiling cooperate to form the cargo compartment and a first vertical opening having a width defined by first and second sides for accessing the interior of the cargo compartment;
  b) a first segmented retractable door proximate the first vertical opening of the cargo compartment; the first door being displaceable from a first vertically-oriented closed position in which the door covers the first vertical opening, to a second open position in which the door is substantially disposed below the first vertical opening;
  c) a first track adapted and configured to receive a first side of the first segmented door, the first track having a first vertically oriented segment disposed along the first side of the first vertical opening; and
  d) a second track adapted and configured to receive a second side of the first segmented door, the second track having a first vertically oriented segment disposed along the second side of the first vertical opening, wherein the first segmented door is downwardly displaceable along the first and second tracks from the first position to the second position, wherein the cargo compartment defines a second vertical opening having a width defined by first and second sides for accessing the interior of the cargo compartment, and the cargo vehicle further includes:

e) a second segmented retractable door proximate the second vertical opening of the cargo compartment; the second segmented retractable door being displaceable from a first vertically-oriented closed position in which the second segmented retractable door covers the second vertical opening to a second open position in which the second segmented retractable door is substantially disposed below the second vertical opening;
  f) a third track adapted and configured to receive a first side of the second segmented retractable door, the third track having a first vertically oriented segment disposed along the first side of the second vertical opening; and
  g) a fourth track adapted and configured to receive a second side of the second segmented retractable door, the fourth track having a first vertically oriented segment disposed along the second side of the second vertical opening, wherein the second segmented retractable door is downwardly displaceable along the third and fourth tracks from the first position to the second position, wherein the first track, second track, third track and fourth track each further comprise horizontal portions extending under the cargo vehicle at different depths below the floor of the cargo compartment such that the first segmented retractable door and second segmented retractable door can slide past each other along the bottom of the cargo compartment.

14. The cargo vehicle of claim 13, wherein the first vertical opening and the second vertical opening are located on opposite sides of the cargo compartment.

15. The cargo vehicle of claim 14, wherein the cargo vehicle includes a plurality of pairs of opposing downwardly retractable doors, wherein each door retracts downwardly below the floor of the cargo compartment.

16. The cargo vehicle of claim 14, wherein the cargo compartment defines a third vertical opening at the back of the cargo compartment having a width defined by first and second sides for accessing the interior of the cargo compartment, and wherein the cargo vehicle further includes:
  a) a third segmented retractable door proximate the third vertical opening of the cargo compartment; the third segmented retractable door being displaceable from a first vertically-oriented closed position in which the second segmented retractable door covers the third vertical opening to a second open position in which the third segmented retractable door is substantially disposed below the third vertical opening;
  c) a fifth track adapted and configured to receive a first side of the third segmented retractable door, the fifth track having a first vertically oriented segment disposed along the first side of the third vertical opening; and
  d) a sixth track adapted and configured to receive a second side of the third segmented retractable door, the sixth track having a first vertically oriented segment disposed along the second side of the third vertical opening, wherein the second segmented retractable door is downwardly displaceable along the fifth and sixth tracks from the first position to the second position.

17. The cargo vehicle of claim 16, wherein the first track, second track, third track, fourth track, fifth track and sixth track each further comprise horizontal portions extending under the cargo vehicle at different depths below the floor of the cargo compartment such that the first segmented retractable door, second segmented retractable door and third segmented retractable door can slide past each other along the bottom of the cargo compartment.

18. The cargo vehicle of claim 16, wherein the first segmented retractable door, second segmented retractable door and third segmented retractable door are adapted and configured to fold in an accordion-like fashion through first, second and third openings defined by the floor of the cargo compartment.

19. A cargo vehicle, comprising:
  a) a cargo compartment, the cargo compartment including:
    i) a floor;
    ii) a plurality of adjoining walls extending upwardly from the floor; and
    iii) a ceiling attached to an upper end of the plurality of adjoining walls, wherein the walls, floor and ceiling cooperate to form the cargo compartment and first and second vertical openings, each of the first and second vertical openings having a width defined by first and second sides for accessing the interior of the cargo compartment
  b) first and second segmented retractable doors proximate the first and second vertical openings of the cargo compartment the first and second retractable doors being displaceable from a first vertically-oriented closed position in which the doors cover the first and second vertical openings, to a second open position in which the doors are substantially disposed below the first and second vertical openings;

c) a first track adapted and configured to receive a first side of the first segmented door, the first track having a first vertically oriented segment disposed along the first side of the first vertical opening;

d) a second track adapted and configured to receive a second side of the first segmented door, the second track having a first vertically oriented segment disposed along the second side of the first vertical opening, wherein the first segmented door is downwardly displaceable along the first and second tracks from the first position to the second position;

e) a third track adapted and configured to receive a first side of the second segmented door, the third track having a first vertically oriented segment disposed along the first side of the second vertical opening;

f) a fourth track adapted and configured to receive a second side of the second segmented door, the fourth track having a first vertically oriented segment disposed along the second side of the second vertical opening, wherein the second segmented door is downwardly displaceable along the third and fourth tracks from the first position to the second position, wherein the first and second segmented doors are adapted and configured to slide past each other below the cargo vehicle.

* * * * *